(12) United States Patent
Chen (10) Patent No.: US 9,901,948 B1
(45) Date of Patent: Feb. 27, 2018

(54) WATER SPRAY GUN HAVING BREAKPROOF FUNCTION

(71) Applicant: SHIN TAI SPURT WATER OF THE GARDEN TOOLS CO., LTD., Chang-Hua, Hsien (TW)

(72) Inventor: Chin-Yuan Chen, Chang-Hua, Hsien (TW)

(73) Assignee: Shin Tai Spurt Water of the Garden Tools Co., Ltd., Chang-Hua, Hsien (TW)

(*) Notice: Subject to any disclaimer, the term of this patent is extended or adjusted under 35 U.S.C. 154(b) by 0 days.

(21) Appl. No.: 15/378,206

(22) Filed: Dec. 14, 2016

(51) Int. Cl.
| | |
|---|---|
| *B05B 7/02* | (2006.01) |
| *B05B 12/00* | (2018.01) |
| *B05B 1/30* | (2006.01) |
| *B05B 9/01* | (2006.01) |
| *B05B 15/06* | (2006.01) |
| *F16K 31/60* | (2006.01) |

(52) U.S. Cl.
CPC .............. *B05B 12/002* (2013.01); *B05B 1/30* (2013.01); *B05B 9/01* (2013.01); *B05B 15/061* (2013.01); *F16K 31/602* (2013.01)

(58) Field of Classification Search
CPC ....... B05B 9/01; B05B 12/002; B05B 1/3026; F16K 5/0442; F16K 27/065
USPC .................................. 251/309–312; 239/526
See application file for complete search history.

(56) References Cited

U.S. PATENT DOCUMENTS

| | | | | |
|---|---|---|---|---|
| 4,756,507 A | * | 7/1988 | McAndrew | F16K 31/46 251/288 |
| 7,124,965 B1 | * | 10/2006 | Chen | A62C 31/02 239/416.4 |
| 7,195,181 B2 | * | 3/2007 | Steingass | B05B 1/304 169/14 |
| 7,328,860 B1 | * | 2/2008 | Chen | B05B 1/3026 137/625.31 |
| 8,490,948 B2 | * | 7/2013 | Lu | A01G 25/00 239/526 |
| 2007/0138321 A1 | * | 6/2007 | Wang | B05B 1/1681 239/441 |
| 2011/0220738 A1 | * | 9/2011 | Cheng | B05B 1/12 239/526 |
| 2014/0054399 A1 | * | 2/2014 | Hsieh | B05B 1/3026 239/526 |

* cited by examiner

*Primary Examiner* — Arthur O Hall
*Assistant Examiner* — Joel Zhou
(74) *Attorney, Agent, or Firm* — Alan D. Kamrath; Kamrath IP Lawfirm, P.A.

(57) ABSTRACT

A water spray gun includes a gun body, a handle, a control valve and a retaining cap. The gun body has a water control compartment which is provided with two rotation channels. Each of the rotation channels has two closed ends forming two stop walls. The handle has two connecting arms. Each of the connecting arms is combined with a limit block which includes a root portion mounted in and covered by each of the connecting arms and an operation portion protruding outward from each of the connecting arms. Thus, when the handle is pivoted relative to the gun body, the operation portion of the limit block is moved in each of the rotation channels of the gun body, and is stopped by one of the two stop walls of each of the rotation channels.

3 Claims, 8 Drawing Sheets

WATER SPRAY GUN HAVING BREAKPROOF FUNCTION

BACKGROUND OF THE INVENTION

1. Field of the Invention

The present invention relates to a gardening tool and, more particularly, to a water spray gun.

2. Description of the Related Art

Figure 6:
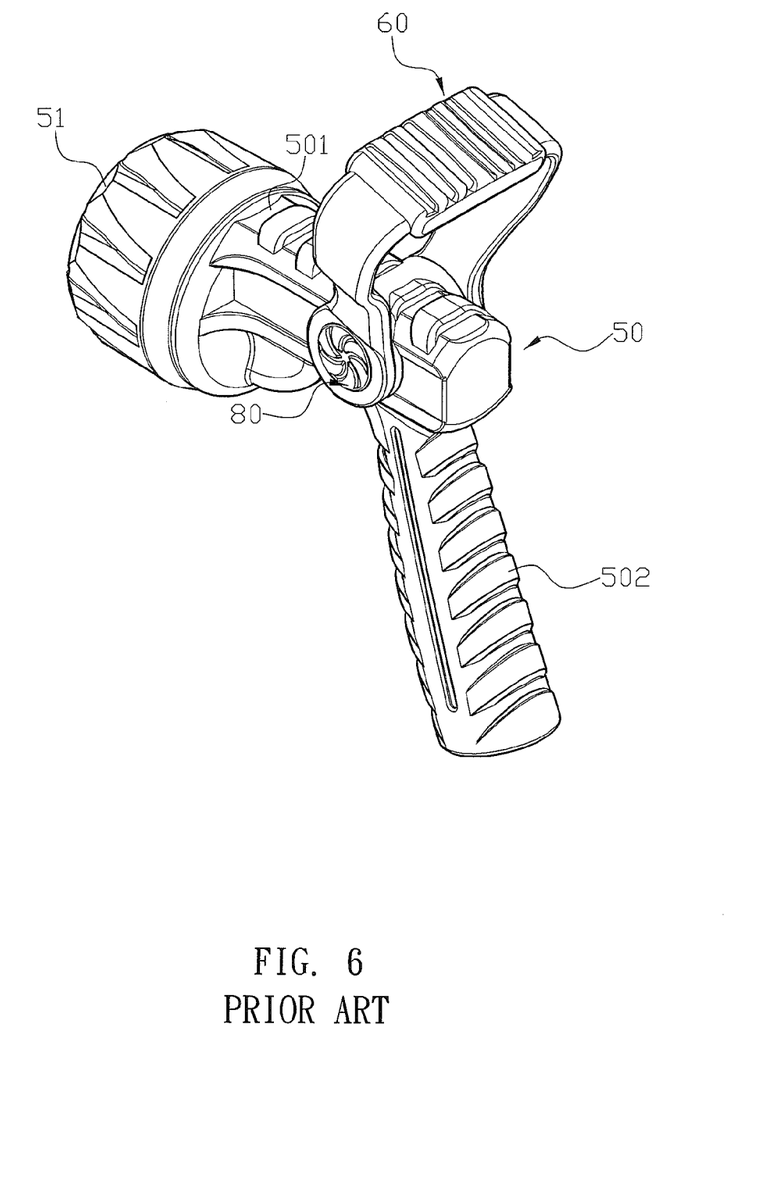
FIG. 6 is a perspective view of a conventional water spray gun in accordance with the prior art.
Figure 7:
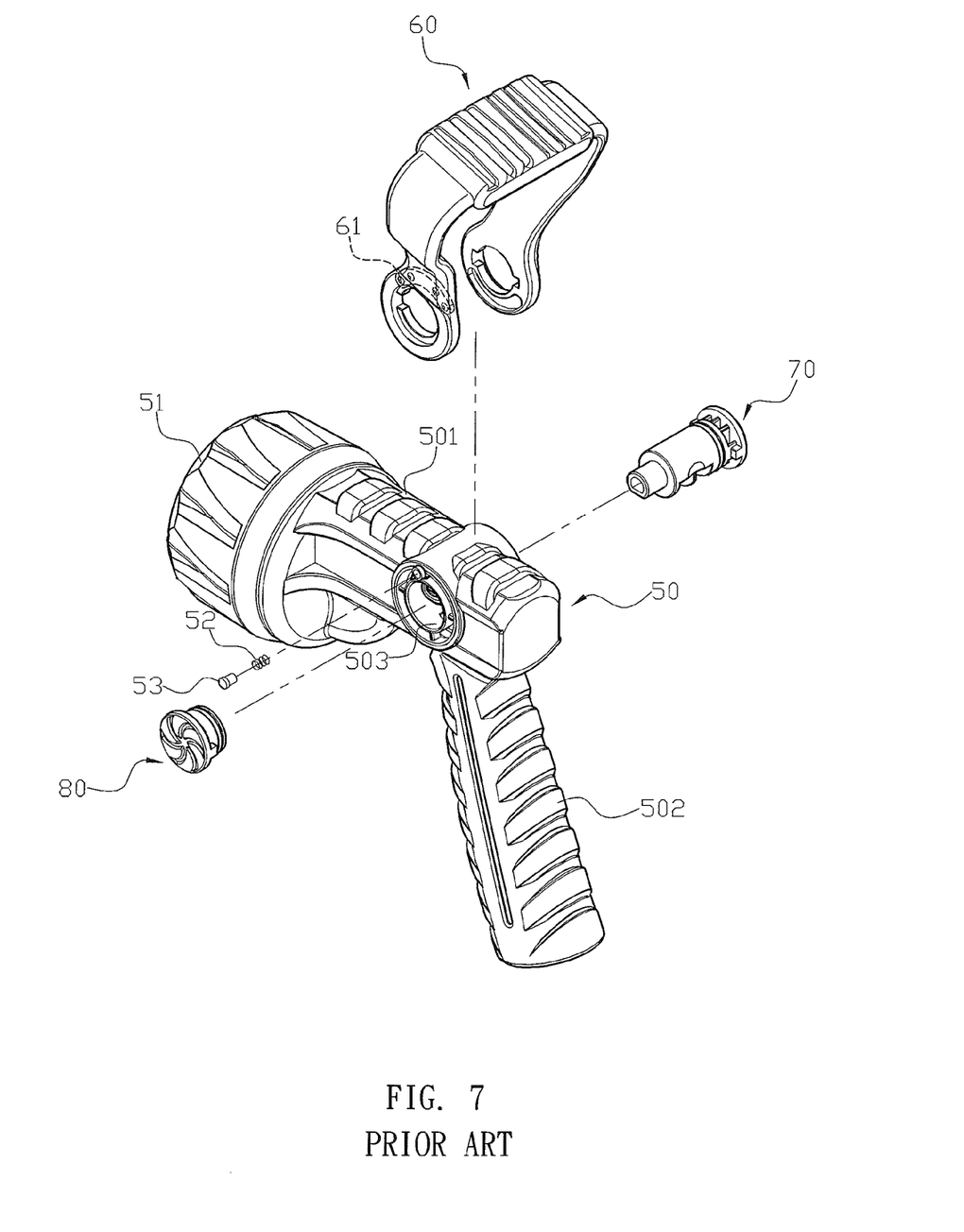
FIG. 7 is an exploded perspective view of the conventional water spray gun in accordance with the prior art.
Figure 8:
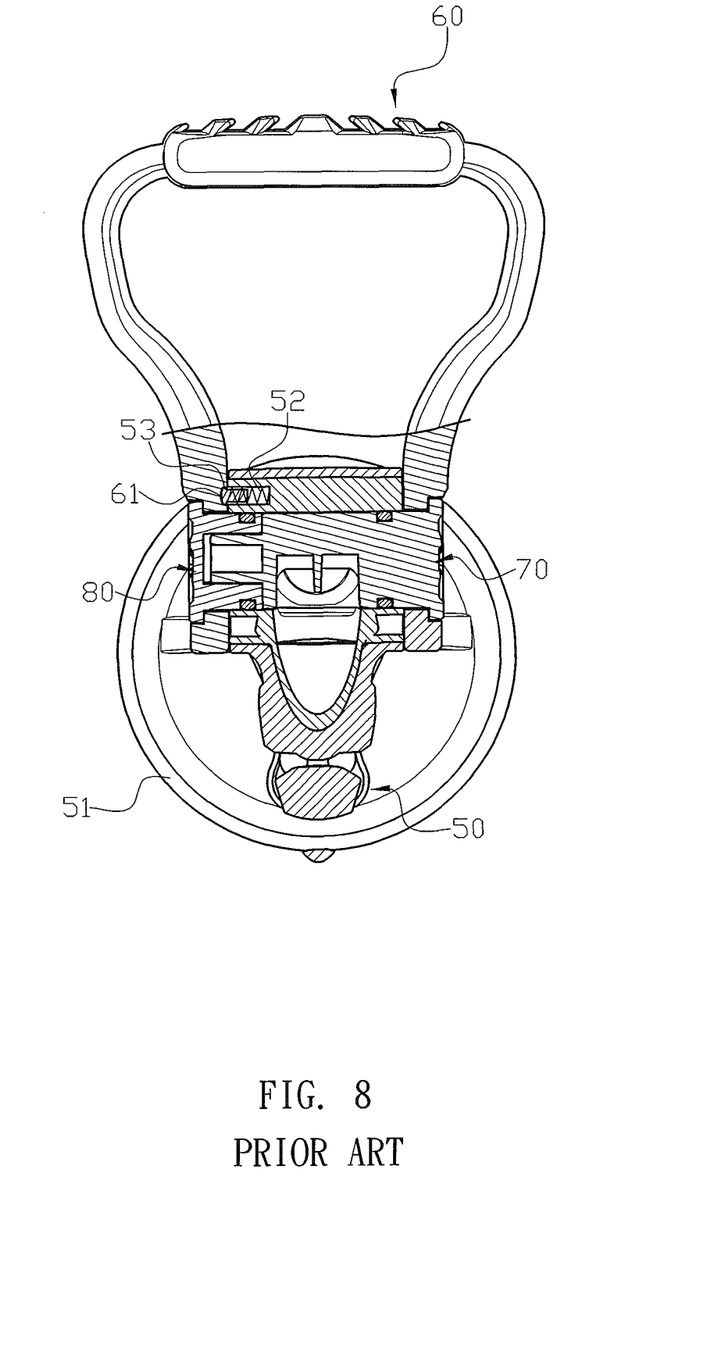
FIG. 8 is a cross-sectional assembly view of the conventional water spray gun in accordance with the prior art.

A conventional water spray gun in accordance with the prior art shown in FIGS. 6-8 comprises a gun body 50, a handle 60 pivotally mounted on the gun body 50, a control valve 70 mounted on the gun body 50 and controlled by the handle 60, and a retaining cap 80 connected with the control valve 70. The gun body 50 has a barrel portion 501, a grip portion 502 and a water control compartment 503 connected between the barrel portion 501 and the grip portion 502. The barrel portion 501 of the gun body 50 has a front end provided with a nozzle 51 and has an interior provided with a water outlet channel connected to the water control compartment 503. The grip portion 502 of the gun body 50 has an interior provided with a water inlet channel connected to the water control compartment 503. The water control compartment 503 of the gun body 50 transversely extend through the gun body 50. The control valve 70 is pivotally mounted in the water control compartment 503. The handle 60 has a side provided with a plurality of positioning holes 61. A positioning pin 53 is movably mounted on the gun body 50 and is locked in one of the positioning holes 61 to position the handle 60 on the gun body 50, and a spring 52 is mounted on the gun body 50 and is biased between the positioning pin 53 and the gun body 50 to push the positioning pin 53 toward one of the positioning holes 61.

In operation, when the handle 60 is pivoted relative to the gun body 50, the control valve 70 is driven by the handle 60 and is rotated between an open position where the control valve 70 is connected to the water outlet channel of the barrel portion 501 and the water inlet channel of the grip portion 502 to open the water flow, and a closed position where the control valve 70 is disconnected from the water outlet channel of the barrel portion 501 and the water inlet channel of the grip portion 502 to close the water flow.

However, the positioning pin 53 has a limited structural strength and cannot withstand a violent collision, so that the positioning pin 53 is broken easily due to an excessive hit when the handle 60 is subjected to an exceeding force or when the gun body 50 is dropped from a high position, thereby shortening the lifetime of the handle. In addition, the spring 52 and the positioning pin 53 are tiny parts that cannot be placed into the gun body 50 easily, thereby causing inconvenience in assembly. Further, the positioning pin 53 is easily dropped out by push of the spring 52.

BRIEF SUMMARY OF THE INVENTION

The primary objective of the present invention is to provide a water spray gun having a breakproof function.

In accordance with the present invention, there is provided a water spray gun comprising a gun body, a handle pivotally mounted on the gun body, a control valve pivotally mounted on the gun body and controlled by the handle, and a retaining cap connected with the control valve. The gun body has a barrel portion, a grip portion and a water control compartment connected between the barrel portion and the grip portion. The control valve is pivotally mounted in the water control compartment. The handle has two connecting arms. One of the two connecting arms of the handle is connected with the control valve. The other one of the two connecting arms of the handle is connected with the retaining cap. The water control compartment of the gun body is provided with two rotation channels. Each of the two rotation channels of the gun body has two closed ends forming two stop walls. Each of the two connecting arms of the handle has a side combined with a limit block by injection molding. The limit block includes a root portion mounted in and covered by each of the two connecting arms of the handle and an operation portion protruding outward from each of the two connecting arms of the handle. In assembly, when the handle is mounted on the gun body, the two connecting arms of the handle are slightly pulled outward, allowing the operation portion of the limit block passing a rim of the gun body, and are rebounded inward, allowing the operation portion of the limit block to be inserted into each of the two rotation channels of the gun body. Thus, the gun body is sandwiched between the two connecting arms of the handle. Then, the control valve extends through one of the two connecting arms and is inserted into the water control compartment of the gun body. Then, the retaining cap extends through the other one of the two connecting arms, is inserted into the water control compartment of the gun body, and is connected with the control valve. Thus, the handle, the control valve and the retaining cap are combined together and are moved simultaneously on the gun body. In such a manner, when the handle is pivoted relative to the gun body, the operation portion of the limit block is moved in each of the two rotation channels of the gun body, and is stopped by one of the two stop walls of each of the two rotation channels. Thus, the handle is stopped by the two stop walls of each of the two rotation channels and is exactly stopped at an open position and a closed position of the control valve.

According to the primary advantage of the present invention, the operation portion of the limit block of each of the two connecting arms of the handle is thick and will not be broken easily due to an excessive hit when the handle is subjected to an exceeding force or when the gun body is dropped from a high position, thereby enhancing the lifetime of the handle.

According to another advantage of the present invention, the root portion of the limit block is integrally combined with and will not be detached from each of the two connecting arms of the handle, so that the limit block is combined with each of the two connecting arms of the handle exactly and solidly.

According to a further advantage of the present invention, the user only needs to pull the two connecting arms of the handle outward to directly mount the handle onto the gun body, without having to in turn place tiny parts between the handle and the gun body, so that the handle and the gun body are assembled easily and quickly.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4, a water spray gun in accordance with the preferred embodiment of the present invention comprises a gun body 10, a handle 20 pivotally mounted on the gun body 10, a control valve 30 pivotally mounted on the gun body 10 and controlled by the handle 20, and a retaining cap 40 connected with the control valve 30.

The gun body 10 has a barrel portion 101, a grip portion 102 and a water control compartment 103 connected between the barrel portion 101 and the grip portion 102. The barrel portion 101 of the gun body 10 has a front end provided with a nozzle 11 and has an interior provided with a water outlet channel connected to the water control compartment 103. The grip portion 102 of the gun body 10 has an interior provided with a water inlet channel connected to the water control compartment 103. The water control compartment 103 of the gun body 10 transversely extend through the gun body 10. The control valve 30 is pivotally mounted in the water control compartment 103.

The handle 20 has two connecting arms 201. One of the two connecting arms 201 of the handle 20 is connected with the control valve 30 to drive the control valve 30 so that the control valve 30 is rotated between an open position where the control valve 30 is connected to the water outlet channel of the barrel portion 101 and the water inlet channel of the grip portion 102 to open a water flow, and a closed position where the control valve 30 is disconnected from the water outlet channel of the barrel portion 101 and the water inlet channel of the grip portion 102 to close the water flow. The other one of the two connecting arms 201 of the handle 20 is connected with the retaining cap 40 to drive the retaining cap 40.

The water control compartment 103 of the gun body 10 is provided with two rotation channels 104 formed on two outer edges thereof. Each of the two rotation channels 104 of the gun body 10 has two closed ends forming two stop walls 105. Each of the two connecting aims 201 of the handle 20 has a side combined with a limit block 21 by injection molding. The limit block 21 includes a root portion 211 mounted in and covered by each of the two connecting arms 201 of the handle 20 and an operation portion 212 protruding outward from each of the two connecting arms 201 of the handle 20.

In assembly, when the handle 20 is mounted on the gun body 10, the two connecting arms 201 of the handle 20 are slightly pulled outward, allowing the operation portion 212 of the limit block 21 passing a rim of the gun body 10, and are rebounded inward, allowing the operation portion 212 of the limit block 21 to be inserted into each of the two rotation channels 104 of the gun body 10. Thus, the gun body 10 is sandwiched between the two connecting arms 201 of the handle 20. Then, the control valve 30 extends through one of the two connecting arms 201 and is inserted into the water control compartment 103 of the gun body 10. Then, the retaining cap 40 extends through the other one of the two connecting arms 201, is inserted into the water control compartment 103 of the gun body 10, and is connected with the control valve 30. Thus, the handle 20, the control valve 30 and the retaining cap 40 are combined together and are moved simultaneously on the gun body 10. In such a manner, when the handle 20 is pivoted relative to the gun body 10, the operation portion 212 of the limit block 21 is moved in each of the two rotation channels 104 of the gun body 10, and is stopped by one of the two stop walls 105 of each of the two rotation channels 104. Thus, the handle 20 is stopped by the two stop walls 105 of each of the two rotation channels 104 and is exactly stopped at the open position and the closed position of the control valve 30.

Figure 1:
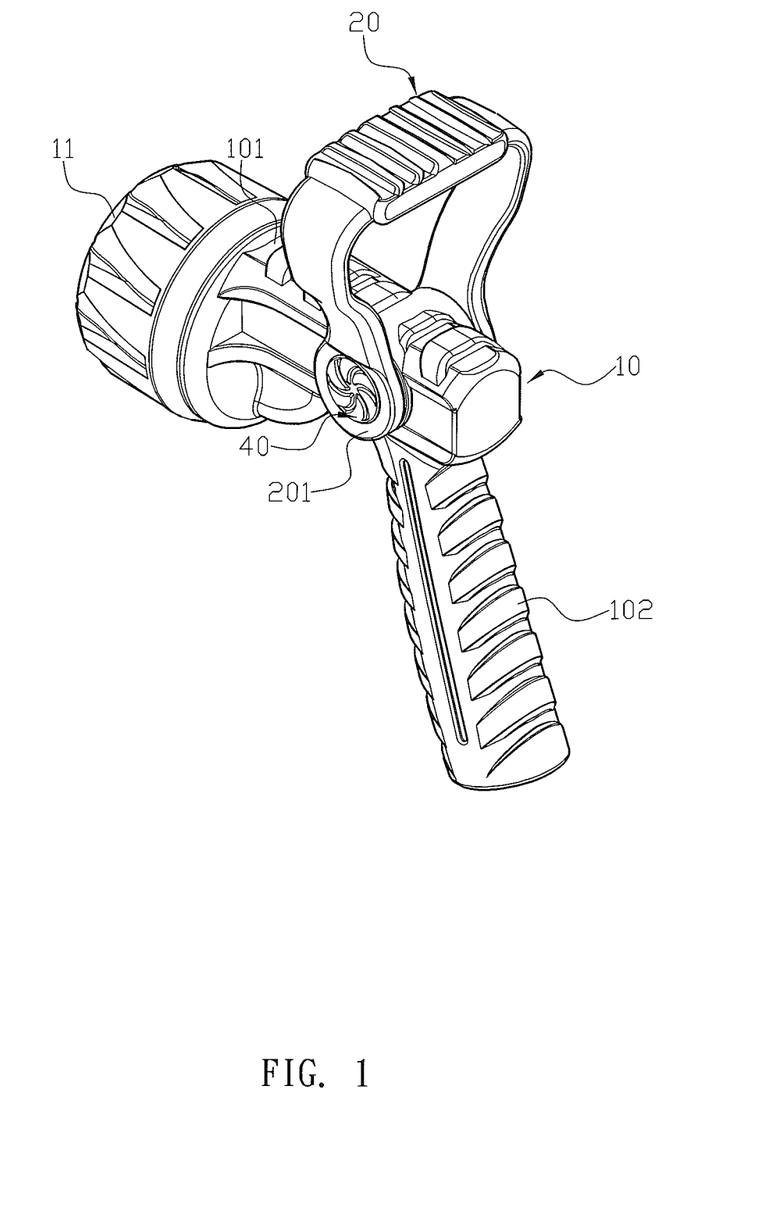
FIG. 1 is a perspective view of a water spray gun in accordance with the preferred embodiment of the present invention.
Figure 2:
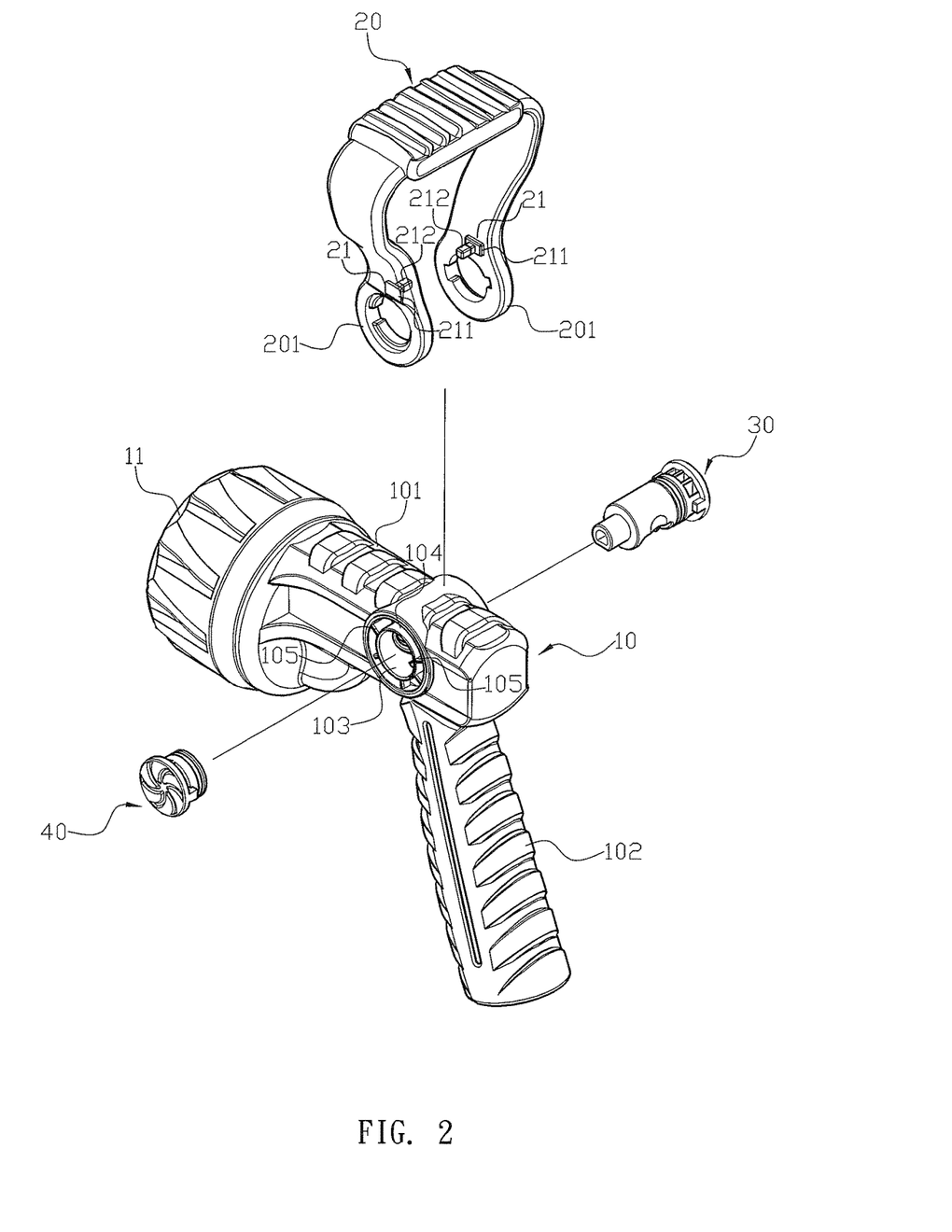
FIG. 2 is an exploded perspective view of the water spray gun in accordance with the preferred embodiment of the present invention.

In the preferred embodiment of the present invention, the root portion 211 of the limit block 21 is expanded relative to and has a dimension greater than that of the operation portion 212. Thus, the root portion 211 of the limit block 21 is larger than the operation portion 212, so that the root portion 211 of the limit block 21 efficiently prevents the limit block 21 from being transversely detached from each of the two connecting arms 201 of the handle 20, and enlarges the contact area of the limit block 21 and each of the two connecting arms 201 of the handle 20.

In the preferred embodiment of the present invention, the limit block 21 is made of metallic material.

In the preferred embodiment of the present invention, the control valve 30 and the retaining cap 40 are combined together by ultra-sonic welding.

Figure 3:
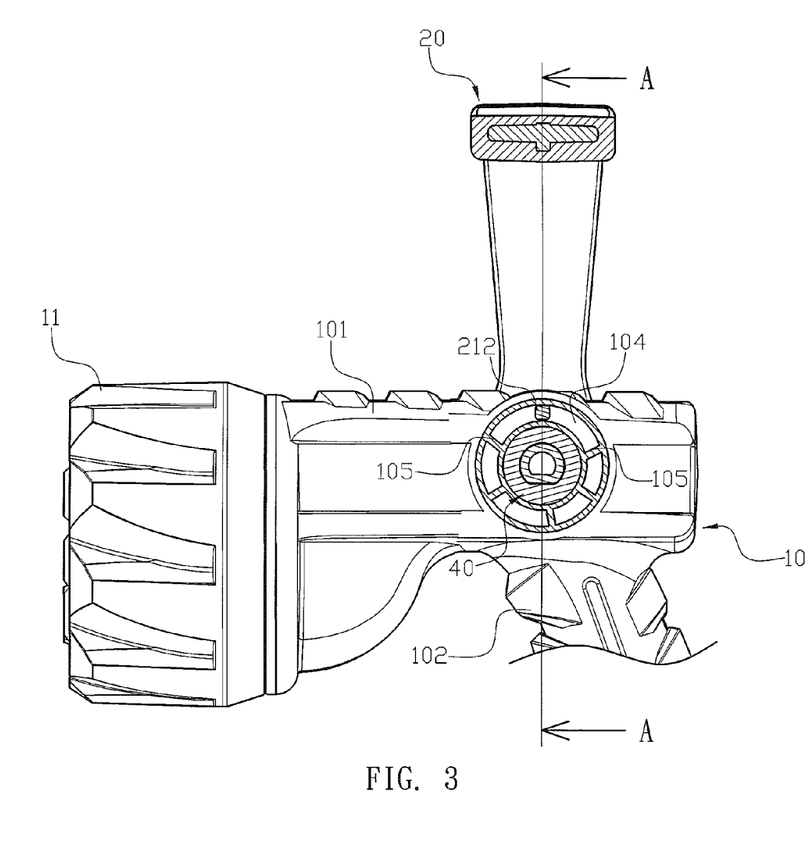
FIG. 3 is a cross-sectional assembly view of the water spray gun in accordance with the preferred embodiment of the present invention.
Figure 4:
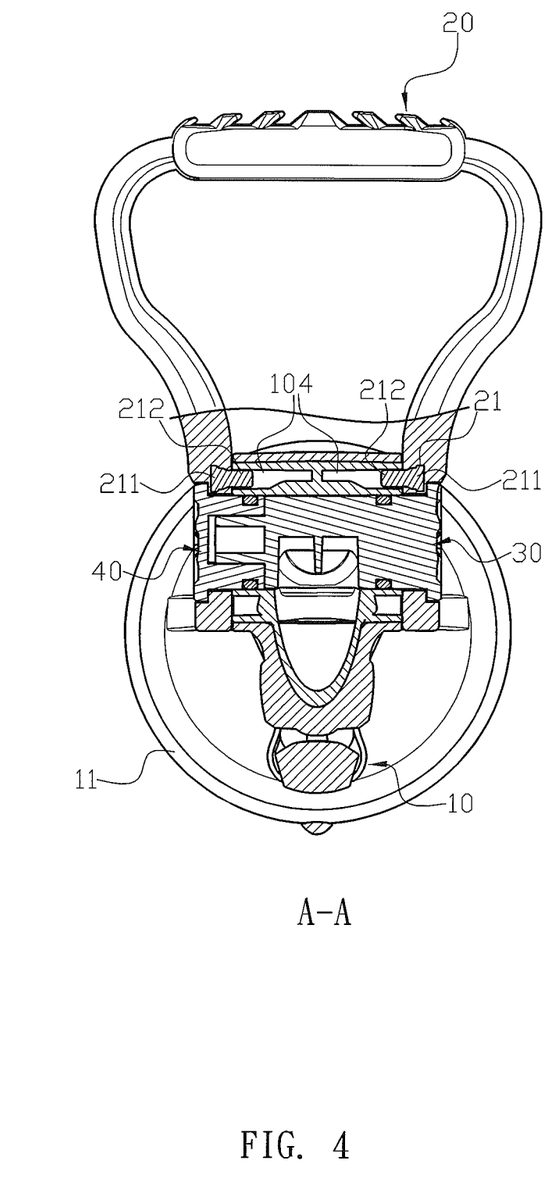
FIG. 4 is a cross-sectional view of the water spray gun taken along line A-A as shown in FIG. 3.
Figure 5:
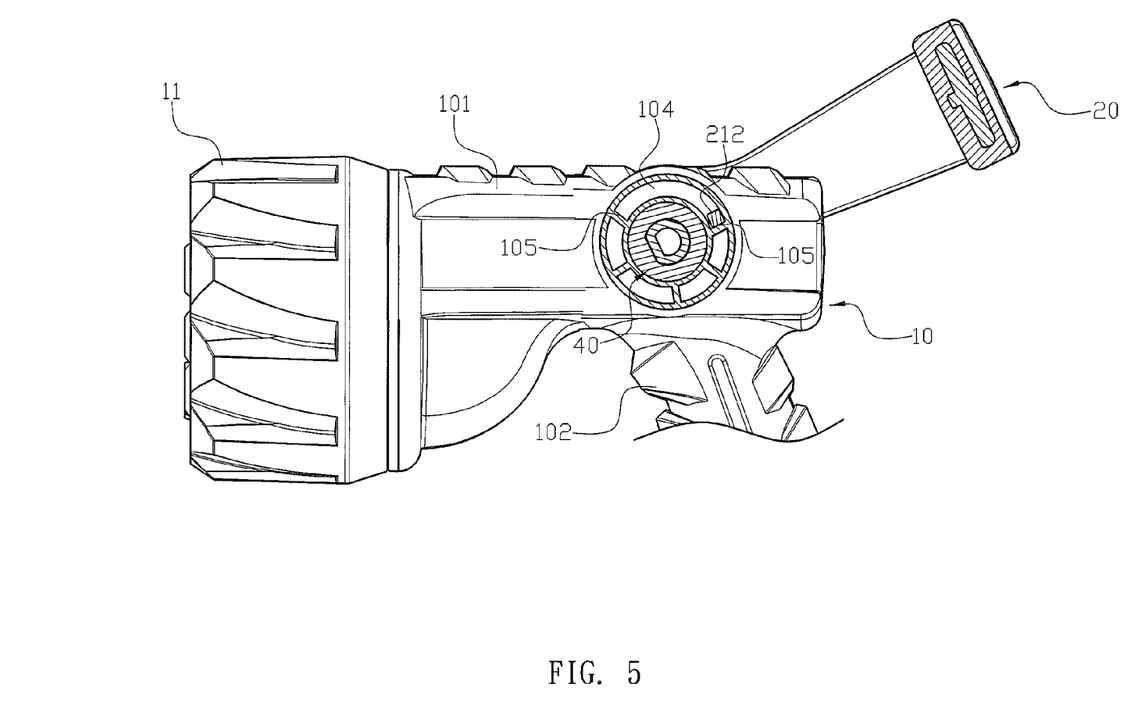
FIG. 5 is a schematic operational view of the water spray gun as shown in FIG. 3 in use.

As shown in FIGS. 3 and 5, when the handle 20 is pivoted relative to the gun body 10, the operation portion 212 of the limit block 21 is moved in each of the two rotation channels 104 of the gun body 10, and is stopped by one of the two stop walls 105 of each of the two rotation channels 104 so as to stop rotation of the handle 20. Thus, the handle 20 is stopped by one of the two stop walls 105 of each of the two rotation channels 104 to reach the open position of the control valve 30, and is stopped by the other one of the two stop walls 105 of each of the two rotation channels 104 to reach the closed position of the control valve 30.

Accordingly, the operation portion 212 of the limit block 21 of each of the two connecting arms 201 of the handle 20 is thick and will not be broken easily due to an excessive hit when the handle 20 is subjected to an exceeding force or when the gun body 10 is dropped from a high position, thereby enhancing the lifetime of the handle 20. In addition, the root portion 211 of the limit block 21 is integrally combined with and will not be detached from each of the two connecting arms 201 of the handle 20, so that the limit block 21 is combined with each of the two connecting arms 201 of the handle 20 exactly and solidly. Further, the user only needs to pull the two connecting arms 201 of the handle 20 outward to directly mount the handle 20 onto the gun body 10, without having to in turn place tiny parts between the handle 20 and the gun body 10, so that the handle 20 and the gun body 10 are assembled easily and quickly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A water spray gun comprising:
   a gun body;
   a handle pivotally mounted on the gun body;
   a control valve pivotally mounted on the gun body and controlled by the handle; and
   a retaining cap connected with the control valve;
   wherein:
   the gun body has a barrel portion, a grip portion and a water control compartment connected between the barrel portion and the grip portion;
   the control valve is pivotally mounted in the water control compartment;
   the handle has two connecting arms;
   one of the two connecting arms of the handle is connected with the control valve;
   the other one of the two connecting arms of the handle is connected with the retaining cap;
   the water control compartment of the gun body is provided with two rotation channels;
   each of the two rotation channels of the gun body has two closed ends forming two stop walls;
   each of the two connecting arms of the handle has a side combined with a limit block by injection molding;
   the limit block includes a root portion mounted in and covered by each of the two connecting arms of the handle and an operation portion protruding outward from each of the two connecting arms of the handle;
   the root portion of the limit block is expanded relative to and has a dimension greater than that of the operation portion;
   when the handle is mounted on the gun body, the two connecting arms of the handle are slightly pulled outward, allowing the operation portion of the limit block passing a rim of the gun body, and are rebounded inward, allowing the operation portion of the limit block to be inserted into each of the two rotation channels of the gun body;
   the gun body is sandwiched between the two connecting arms of the handle;
   the control valve extends through one of the two connecting arms and is inserted into the water control compartment of the gun body;
   the retaining cap extends through the other one of the two connecting arms, is inserted into the water control compartment of the gun body, and is connected with the control valve;
   the handle, the control valve and the retaining cap are combined together and are moved simultaneously on the gun body;
   when the handle is pivoted relative to the gun body, the operation portion of the limit block is moved in each of the two rotation channels of the gun body, and is stopped by one of the two stop walls of each of the two rotation channels; and
   the handle is stopped by the two stop walls of each of the two rotation channels and is exactly stopped at an open position and a closed position of the control valve.

2. The water spray gun of claim 1, wherein the limit block is made of metallic material.

3. The water spray gun of claim 1, wherein the control valve and the retaining cap are combined together by ultra-sonic welding.

* * * * *